United States Patent [19]

Semon

[11] Patent Number: 4,732,073

[45] Date of Patent: Mar. 22, 1988

[54] PRIMER POCKET SWAGING DEVICE

[76] Inventor: Douglas C. Semon, 10330 Goldsberry Rd., Shreveport, La. 71106

[21] Appl. No.: 939,069

[22] Filed: Dec. 8, 1986

[51] Int. Cl.[4] ........................ C06B 21/00; F42B 33/10; B67B 7/00; F16L 45/00

[52] U.S. Cl. ........................................ 86/1.1; 15/104.2; 81/3.42; 81/3.44; 86/36; 86/37

[58] Field of Search ...................... 15/104.2; 86/23, 12, 86/24, 1.1, 25, 36–38, 28, 39; 29/254, 255; 81/3.4, 3.05, 3.41, 3.42, 3.44; 408/211, 189

[56] References Cited

U.S. PATENT DOCUMENTS

| | | | |
|---|---|---|---|
| 3,602,084 | 8/1971 | Corcoran | 86/23 |
| 3,971,322 | 7/1976 | Olsen | 102/204 |
| 4,076,446 | 2/1978 | Lindstaedt | 408/227 |
| 4,163,410 | 8/1979 | Dillon | 86/23 |
| 4,343,222 | 8/1982 | Dillon | 86/27 |
| 4,385,546 | 5/1983 | Lee | 86/23 |
| 4,405,269 | 9/1983 | Hertzler | 408/211 |
| 4,468,829 | 9/1984 | Christensen | 408/211 |
| 4,620,472 | 11/1986 | Dillon | 86/27 |

*Primary Examiner*—Stephen J. Lechert, Jr.
*Assistant Examiner*—Howard J. Locker
*Attorney, Agent, or Firm*—John M. Harrison

[57] ABSTRACT

A primer pocket swaging device for use in cartridge reloading equipment, which is characterized by a cylindrically-shaped collet cover having a hollow, threaded interior for receiving a threaded nipple to enclose an expandable collet. The collet includes four shaped collet segments fitted together in expandable relationship by means of an O-ring and one end of a punch rod projects through the collet and the opposite end seats on the plunger of the reloading equipment by operation of a rod lock nut and an adaptor. The upper end of the collet cover is bevelled and fitted with an opening to receive the base end of an empty shell casing, wherein the base of the shell casing is inserted in the opening and is momentarily seated and held in the collet, while the punch rod extends upwardly and swages the empty primer pocket in the casing base responsive to operation of the reloading apparatus. After the swaging operation is complete, the casing is released from the collet by further manipulation of the reloading apparatus to force the punch rod downwardly and the primer pocket swaging device is in position to receive a second shell casing.

46 Claims, 9 Drawing Figures

PRIMER POCKET SWAGING DEVICE

BACKGROUND OF THE INVENTION

1. Field of the Invention

This invention relates to reloading apparatus and more particularly, to a primer pocket swaging device which is capable of being positioned in a cartridge loading press and manipulated by operation of the loading press to swage the empty primer pocket of a shell casing. The primer pocket swaging device of this invention is typically clamped in a lever-type loading press and is characterized by a cylindrical collet cover which houses an expandable collet positioned inside the collet cover and operated by a punch rod attached to the plunger of the loading press. A shell casing is inserted in an opening provided in the collet cover and the base of the casing is seated in the collet segments of the expandable collet, while the primer pocket is swaged responsive to manipulation of the loading press lever. Manipulation of the lever in the opposite direction opens the collet segments to release the cartridge after the swaging operation is complete and another casing is inserted in the collet cover for engagement by the collet segments, to repeat the operation.

One of the problems realized in swaging primer pockets prior to inserting new primers in spent sheel casings, is that of swaging the primer pockets to a uniform tolerance in order to insure that the new primer will fit snugly and uniformly in the casing base. When military-style cartridges are manufactured, a crimp is formed in the primer pocket where the primer seats in the cartridge base and this crimp must be removed by reaming or "swaging", in order to accurately seat a new primer in the primer pocket. The primer pocket swaging device of this invention automatically swages the primer pocket of shell casings by mounting the device in a loading press, individually inserting spent and deprimered shell casings through an opening located in a collet cover which houses an expandable collet, engaging the extractor groove in the casing base with the collet and swaging the primer pocket responsive to operation of the reloader lever while the casing is momentarily held in swaging configuration by the collet. Further manipulation of the reloading press lever opens the collet and releases the swaged casing after the swaging operation is complete. The primer pocket swaging device of this invention can be used with any piston-type reloader or loading press which is operated to cause a plunger to reciprocate in the reloader frame. Typical of the reloading equipment which can be used to swage the primer pocket of a spent casing using the device of this invention is a loading press of the general design illustrated in FIG. 1 of applicants drawings, which is sold under the trademark "RCBS".

2. Description of the Prior Art

Various types of cartridge loading apparatus and similar apparatus dealing with the reloading of cartridges is well known in the art. An early "Pocket Cartridge Loader" is detailed in U.S. Pat. No. 361,966, dated Apr. 26, 1887, to G. W. Morse. The Morse loader includes a holder or socket tube having external limiting shoulders or abutments, a movable cap or headpiece and a bullet punch, both limited by the shoulders, for accurately setting a bullet in a cartridge. U.S. Pat. No. 2,741,148, dated Apr. 10, 1956, to A. R. Thompson, Jr. discloses a "Loading Die for Small Arms Ammunition". The Thompson device is characterized by an attachment for use with an ammunition loading press frame to function with the loading press frame for loading or reloading cartridge cases. The device is also operable to reshape and resize the cartridge cases, remove the fired primer and apply a new bullet. A "Cartridge Forming Apparatus Utilizing Explosive Pressure", is disclosed in U.S. Pat. No. 3,162,087, dated Dec. 22, 1964, to J. Lakes. The apparatus of the invention includes a die member provided with an elongated bore having an opening in one end thereof and adapted to receive a blank shell. The bore includes a body section which terminates in one end and has a diameter corresponding to the outer diameter of the body of a wildcat shell to be sized. The bore is provided with a reduced diameter portion adjacent the body section and spaced from the open end a predetermined distance, for shaping the neck and shoulder of the shell. A shell holder device is releasably secured to the die member for closing one end thereof to contact the shell adjacent the base and hold it in the bore. The shell holder is movable between a first position spaced from the die member and an operative position with the die member, wherein the blank shell is forced into the bore through the open end, causing the shell to assume a shape no greater than the bore. A device for locking the shell holder and the die member in the operative position is also disclosed. U.S. Pat. No. 3,636,812, dated Jan. 25, 1972, to John N. Nuler, discloses a "Priming Tool". The priming tool of this invention includes a shell holder for clamping the head of an ammunition case on the tool to align the primer pocket of the case with a punch. The punch is advanced in an adjusted motion to press each primer a uniform depth into the pocket of each case, regardless of variations in the rim thickness between casings. A "Centerfire Cartridge Priming Tool" is disclosed in U.S. Pat. No. 4,142,441, dated Mar. 6, 1979, to Gordon N. Schaenzer. This device is intended for hand-held use and includes a one piece, molded tool body and a shell casing holder integrally embedded in an end of the tool body. A lever is pivotally attached to the body adjacent the shell casing holder and functions to force a new primer into the priming chamber of the shell.

The swaging primer pockets in empty shell casings is traditionally accomplished by reamers such as those disclosed in the 8th edition, page 207 of Herters catalog. These hand-held reamers are difficult to use and sometimes result in incompletely or inaccurately swaged primer pockets which can cause a misfit of the new primer in the primer pocket of the casing. Use of these hand-held primers is also laborious and time consuming and sometimes results in lack of uniformity in seating the primers in shell casings during the reloading operation.

Accordingly, it is an object of this invention to provide a new and improved primer pocket swaging device which can be mounted in a conventional loading press or reloader and is capable of quickly and easily swaging the primer pocket of an empty shell casing by manipulating the handle of the reloader.

Another object of this invention is to provide a new and improved primer pocket swaging device which is characterized by a collet cover designed to contain an expandable collet which is seated on a shaped shaft, such that reciprocation of the shaft inside the collet by operation of a loading press receiving the swaging device selectively closes the collet segments to grip a shell casing, swages the open primer pocket in the casing base and expands the collet segments to release the shell casing from the collet cover.

Yet another object of this invention is to provide a new and improved primer pocket swaging device for use in a conventional loading press, which swaging device includes a generally cylindrically-shaped collet cover provided with a top opening and threadibly receiving a hollow nipple at the opposite end thereof. An expandable collet is located inside the collet cover and engages a rod bulb provided on a rod which extends through the collet, wherein the collet is expandable by upward reciprocation of the rod responsive to operation of the loading press to receive the base of a shell casing inserted through the top opening in the collet cover and retractable by downward reciprocation of the rod to engage the extractor groove of the shell casing while the rod swages the primer pocket in the shell casing. The collet is reexpandable by further operation of the loading press to release the shell casing from the collet cover.

SUMMARY OF THE INVENTION

These and other objects of the invention are provided in a new and improved primer pocket swaging device which is adapted for use with a conventional loading press or cartridge reloading apparatus and includes a cylindrically-shaped collet cover having an opening at one end for receiving the base of a shell casing, an expandable collet located inside the collet cover and a punch rod having a bulb or enlargement spaced from a rod neck extending through the collet cover, with the bulb end of the punch rod adapted to swage the primer pocket and the opposite end attached to the plunger of the loading press. The collet is selectively expandable when located on the punch rod above the rod neck to receive and then engage the base flange of the shell casing when the shell casing is inserted in the collet cover opening and the collet engages the bulb and punch rod below the rod neck, while the punch rod swages the primer pocket. When the swaging operation is complete, the punch is extended from the shell casing and the collet expands as the rod neck retracts from contact with the collet, to release the shell casing from the collet cover.

BRIEF DESCRIPTION OF THE DRAWINGS

The invention will be better understood by reference to the accompanying drawings, wherein.

DESCRIPTION OF THE PREFERRED EMBODIMENTS

Figure 1:
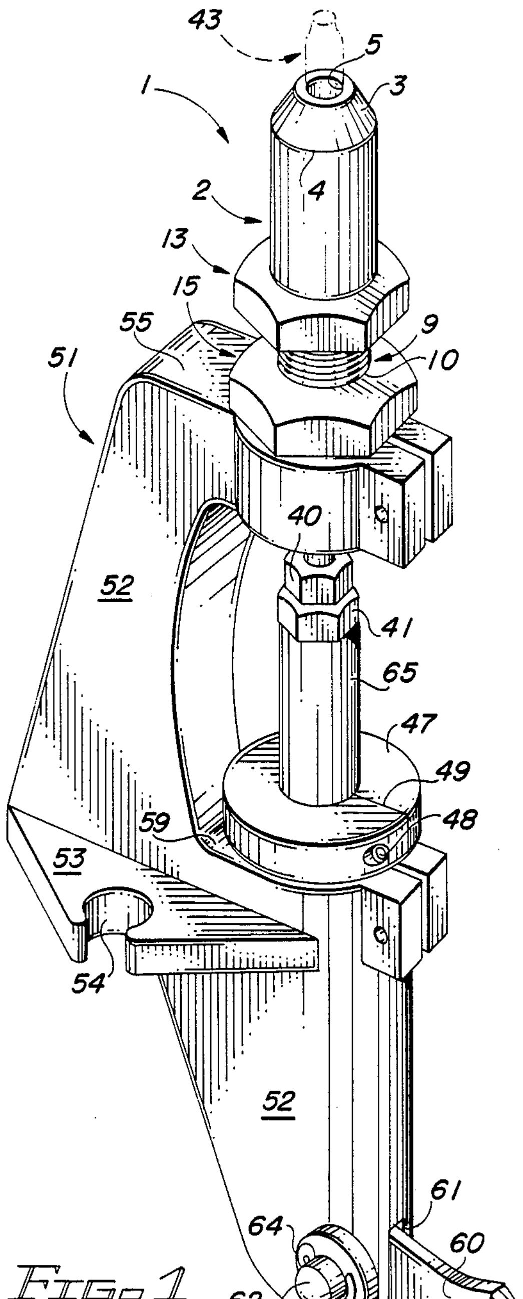
FIG. 1 is a perspective view of the primer pocket swaging device of this invention mounted in a conventional, hand-operated loading press.
Figure 2:
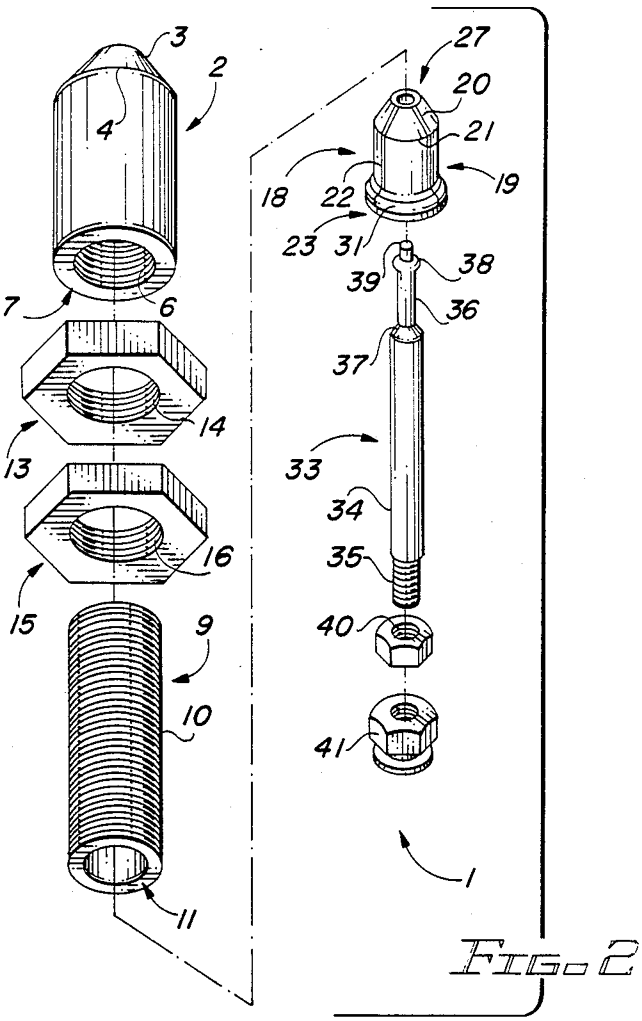
FIG. 2 is an exploded view of the primer pocket swaging device illustrated in FIG. 1.

Referring initially to FIGS. 1 and 2 of the drawings, the primer pocket swaging device of this invention is generally illustrated by reference numeral 1. The primer pocket swaging device 1 is characterized by a cylindrically-shaped collet cover 2, provided with an outside bevel 3 extending from a circular cove shoulder 4, to a casing open 5 provided in the end thereof. The collet cover 2 is fitted with internal cover threads 6, as illustrated in FIG. 2 and is further provided with a cover cavity 7 which communicates with the casing opening 5. A nipple 9 is provided with external nipple threads 10 and inserts in the cover cavity 7 of the collet cover 2, with the nipple threads 10 engaging the internal cover threads 6 provided in the collet cover 2. The nipple 9 is also provided with a nipple bore 11 which communicates with the cover cavity 7 of the collet cover 2. A top lock nut 13, provided with top lock nut threads 14 and a bottom lock nut 15, which is fitted with bottom lock nut threads 16, are threadibly inserted on the nipple 9, as illustrated, for securing the nipple 9 tightly to the collet cover 2 and to the frame head 55 of the loading press 51. As further illustrated in FIG. 2, a collet 18 projects inside the collet cover 2 and is defined by multiple collet segments 19, joined at the base by an O-ring 31 in expandable relationship, as hereinafter described. A punch rod 33 is provided with a rod bulb 38 at one end and with a swaging tip 39 projecting from the rod bulb 38. The rod bulb 38 is shaped in a working segment 36 of lesser diameter than the diameter of the primary segment 34 of the punch rod 33 and the working segment 36 extends from the primary segment 34 at a tapered rod neck 37, as illustrated. Segment threads 35 are provided on the opposite end of the primary segment 34 from the rod neck 37, and in a most preferred embodiment of the invention the diameter of the rod bulb 38 is approximately equal to the diameter of the primary segment 34 of the punch rod 33. A rod lock nut 40 and a cooperating ram adapter 41 are threaded on the segment threads 35, in order to attach the punch rod 33 of the primer pocket swaging device 1 of the plunger 65 of the loading press 51, as illustrated in FIG. 1. As further illustrated in FIG. 1, the loading press 51 is characterized by a shaped frame 52, which is fitted with at least one frame flange 53 for seating the loading press 51 on a workbench or other stable base. A mount opening 54 projects through the frame flange 53, in order to accommodate a bolt for mounting the frame 52 to the workbench. The frame head 55 defines the top portion of the frame 52 and is characterized by a threaded opening (not illustrated) for securing the nipple 9 of the primer pocket swaging device 1 securely, but removably in the frame head 55. A frame base 59 is provided in order to seat the ram stop ring 47, which is tightly fitted to the plunger 65 by means of an allen screw 48, extending through the stop ring slot 49 provided in the ram stop ring 47. One end of the arm 60 is pivoted in a bifurcation 61 located in the bottom portion of the frame 52, by means of an arm pin 62, a washer 63 and a cooperating cotter pin 64, as illustrated. Accordingly, it will be appreciated from a consideration of FIG. 1 that manipulation of the arm 60 effects reciprocation of the plunger 65 and operation of the primer pocket swaging device 1, as hereinafter described.

Figure 3:
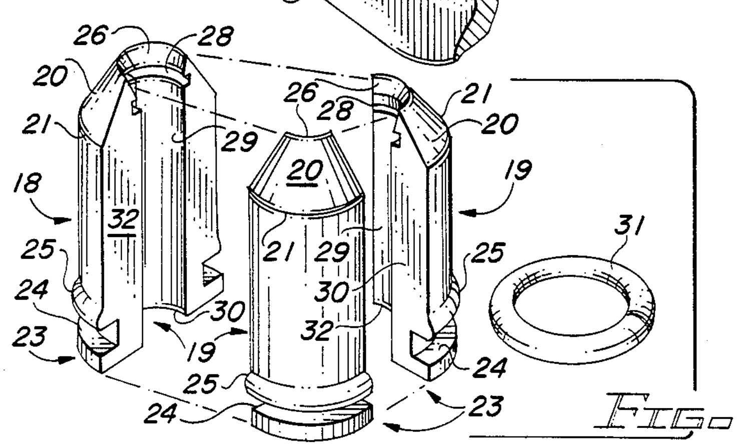
FIG. 3 is a perspective, exploded view of four collet segments which cooperate to define a preferred collet for use in the primer pocket swaging device of this invention.

Referring now to FIGS. 2 and 3 of the drawings in another most preferred embodiment of the invention, the collet 18 is characterized by four collet segments 19, each of which is fitted with a collet segment bevel 20 on the top thereof, which collet segment bevel 20 extends between the segment shoulder 21 and the collet opening 27. A collet groove 28 is located beneath each collet arc 26, which extends inwardly of the collet segments 19 and each collet groove 28 is recessed into the uniform, curved bore segment 29 of each of the collet segments 19, separating the bore segments 29 from the collet arcs 26, respectively. A base groove 24 is provided in the segment base 23 of each of the collet segments 19 and is topped by a base shoulder 25, which protrudes from the outer surface of the collet segment 19, as illustrated. The collet arcs 26 and the collet segments 19 combine when the collet segments 19 are assembled as illustrated in FIG. 2, to define the collet opening 27, illustrated in FIG. 2. The collet segments 19 are assembled as illustrated in FIG. 2 by joining the respective segment sides 30 to define the slots 22, as further illustrated in FIG. 2.

Figure 5A:
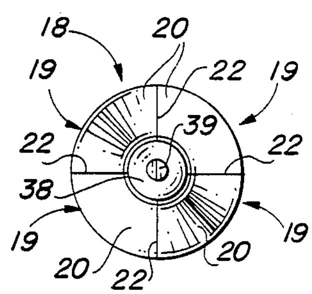
FIG. 5A is a top view of the assembled collet segments in closed configuration.
Figure 5B:
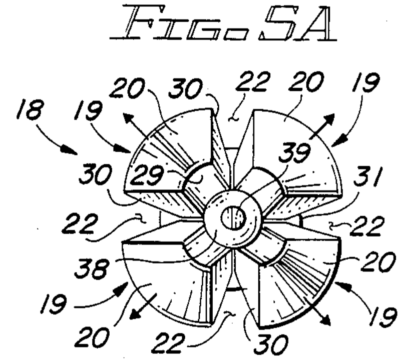
FIG. 5B is a top view of the assembled collet segments in expanded configuration.
Figure 4A:
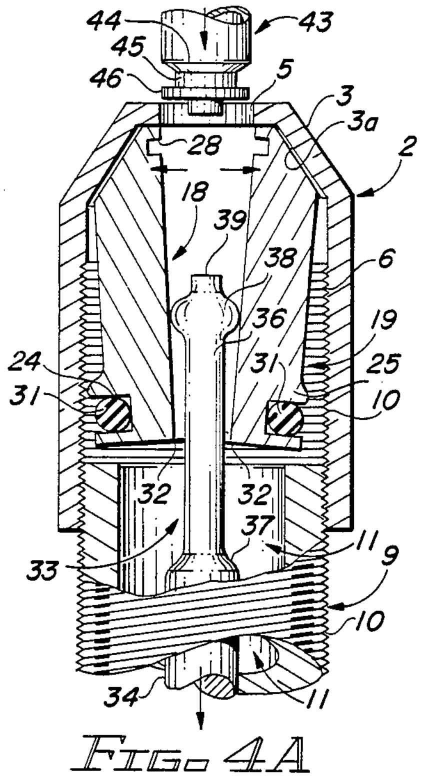
FIG. 4A is a sectional view of the upper portion of the primer pocket swaging device illustrated in FIGS. 1 and 2, with the punch rod positioned to maintain the collet in open configuration.
Figure 4B:
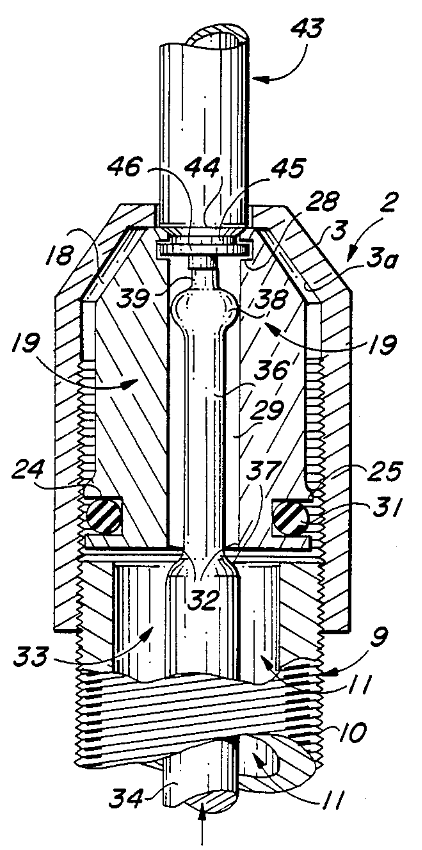
FIG. 4B is a sectional view of the upper portion of the primer pocket swaging device illustrated in FIG. 4A, with the collet in closed configuration responsive to upward movement of the punch rod and the swaging tip approaching registration with the primer pocket of a shell casing base.
Figure 4C:
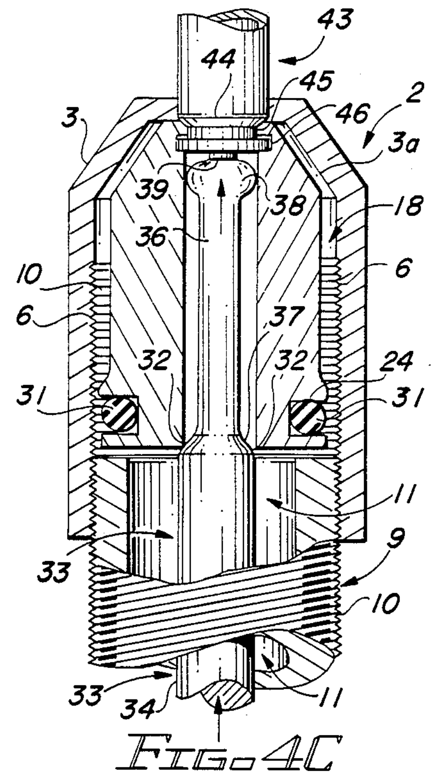
FIG. 4C is a sectional view of the upper portion of the primer pocket swaging device illustrated in FIG. 4B, with the punch rod in maximum upward configuration and the swaging tip engaging the primer pocket in swaging configuration.
Figure 4D:
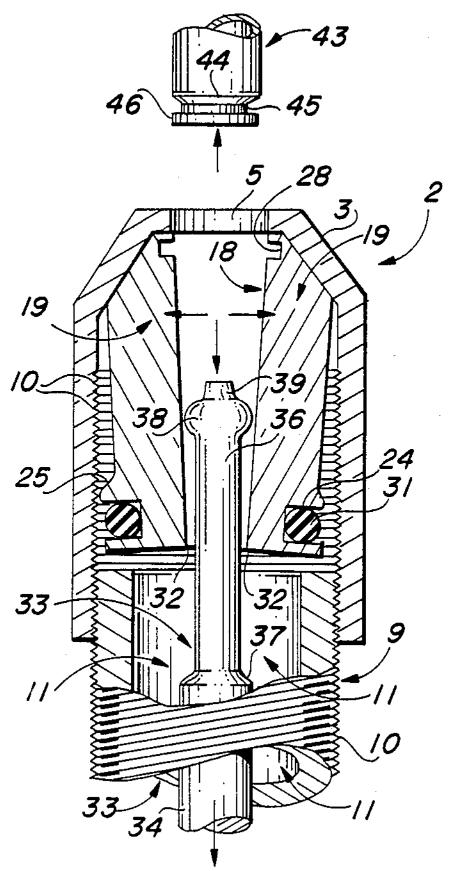
FIG. 4D is a sectional view of the upper portion of the primer pocket swaging device illustrated in FIG. 4A, with the collet again disposed in open configuration as the punch rod returns downwardly to the relative position illustrated in FIG. 4A.

Referring now to FIGS. 4A through 4D, the collet segments 19 of the collet 18 illustrated in assembled configuration inside the collet cover 2, with the working segment 36 of the punch rod 33 extending into the nipple 9 and through the collective bore segments 29 of the collet segments 19. The collet 18 is assembled inside the collet cover 2 with the O-ring 31 inserted in the base groove 24 of the collet segments 19, to facilitate radial opening and closing of the top portion of the collet 18, as illustrated in FIGS. 4A, 4D and 5B. When the punch rod 33 is extended to its full upward position with the working segment 36 and rod neck 37 located completely inside the collective bore segments 29 of the assembled collet segments 19, the collet 18 is closed, as illustrated in FIGS. 4B, 4C and 5A. As further illustrated in FIGS. 4A-4D, an empty shell casing 43 is characterized by a casing base 44, having an extractor groove 45 defining a base flange 46 terminating the base end of the shell casing 43. The spent primer (not illustrated) has been removed from the primer pocket (not illustrated) located in the center of the base flange 46 and the primer pocket is ready to be swaged preparatory to receiving a new primer.

The primer pocket swaging device 1 of this invention is utilized as follows. Referring to FIG. 1 of the drawings, the primer pocket swaging device 1 is first mounted in the loading press 51 by inserting the punch rod 33 and nipple 9 in the threaded opening (not illustrated) provided in the frame head 55. The bottom lock nut 15 is then tightened on the nipple 9 against the frame head 55, to lock the primer pocket swaging device in the loading press 51. The collet cover 2 is then threadibly adjusted on the nipple 9 to facilitate proper operation of the collet 18 in engaging the base flange 46 of a casing base 44 of selected size. When this adjustment is complete, the top lock nut 13 is tightly threaded on the nipple 9 against the base of the collet cover 2, to lock the selected collet 18 adjustment into the primer pocket swaging device 1. The ram adapter 41 is then threaded into engagement with a threaded stud or bolt (not illustrated) located on the plunger 65 and the rod lock nut 40 is tightened on the segment threads 35 against the ram adapter 41, to secure the punch rod 33 to the plunger 65. Referring again to FIGS. 1, 4A and 5B, when it is desired to insert the casing base 44 of a shell casing 43 into the primer pocket swaging device 1 in order to swage the primer pocket, the shell casing 43 is initially positioned above the casing opening 5 in the collet cover 2, as illustrated in FIG. 4A. The arm 60 of the loading press 51 is then pivoted upwardly, which causes the plunger 65 and punch rod 33 to move downwardly and lower the rod bulb 38 and working segment 36 of the punch rod 33 inside the bore segment 29 of the collet 18. This maneuver forces the respective collet segments 19 radially outwardly as illustrated in FIGS. 4A and 5B and as the rod bulb 38 traverses the collective bore segments 29 of the collet segments 19, the rod neck 37 drops below the collet segments 19 and the bore segment edges 32 of the collet segments 19 recess against the smaller diameter of the working segment 36 of the punch rod 33. This radial outward movement of the collet segments 19 in concert widens the collet groove 28 and enables the base flange 46 and extractor groove 45 of the casing base to be projected through the casing opening 5 and inside the collet cover 2 to the position illustrated in FIG. 4B. When this insertion of the casing base 44 of the shell casing 43 inside the collet cover 2 is accomplished, the arm 60 of the loading press 51 is pivoted downwardly, thereby forcing the plunger 65 and punch rod 33 upwardly, such that the bore segment edges 32 of the bore segments 29 again engage the rod neck 37. This forces the collet segments 19 to collectively close inwardly at the collet arc 26, such that the base flange 46 of the casing base 44 registers with the collective collet groove 28 in the collet segments 19. The shell casing 43 is thereby held tightly and securely inside the collet cover 2 by engagement with the collet segments 19 and continued upward movement of the punch rod 33 responsive to further downward manipulation of the arm 60 causes the swaging bulb tip 39 to engage and swage the primer pocket in the base flange 46 of the casing base 44, as illustrated in FIG. 4C. When the swaging operation is complete, the arm 60 is again pivoted upwardly to force the punch rod 33 and the working segment 36 downwardly to again effect inward recess of the bore segment edges 32 against the working segment 36, outward radial expansion of the top portion of the collet segments 19 and release of the base flange 46 of the shell casing 43 from the collet groove 28 in the collet segments 19, as illustrated in FIGURE 4D. This procedure is then repeated to quickly and easily swage a large number of shell casings 43 in a short period of time.

It will be appreciated by those skilled in the art that the primer pocket swaging device 1 of this invention is simple in design, easy to operate and can be used with substantially any cartridge reloading equipment exemplified by the loading press 51, wherein the punch rod 33 can be fitted to a corresponding plunger 65 and the nipple 9 mounted in the frame head 55, as described with respect to FIG. 1. Furthermore, the collet cover 2 and the collet 18 can be fabricated of sufficient size to receive a shell casing 43 of any desired caliber, in order to swaged the primer pocket of substantially any shell casing 43. Adjustments in the nipple 9 and collet cover 2 facilitate relative expansion of the collet segments 19 inside the collet cover 2 by selectively increasing and decreasing the distance between the inside bevel 3a and the collet segment bevel 20. This adjustment facilitates gripping of a shell casing a substantially any size which will fit through the casing opening 5, by the collet segments 19. Furthermore, it is understood that while a preferred resilient retaining means for joining the collet segments 19 together at the base is an O-ring 31, other retainers such as coil springs, clips, retainers and the like, can also be used to accomplish this purpose.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A primer pocket swaging device for use with a loading press having a frame, a plunger reciprocating in the frame and means carried by the frame for reciprocating the plunger, said primer pocket swaging device comprising collet cover means adapted for mounting in the frame of the loading press, said collet cover means provided with an opening in one end for receiving a shell casing base having a base flange and an empty primer pocket; expandable collet means located in said collet cover means for selectively engaging and securing the shell casing base inside the collet cover means; and rod means having one end slidably engaging said collet means, with the opposite end of said rod means adapted for attachment to the plunger in the loading press, for selectively contracting and expanding said collet means to grip the shell casing base, swage the primer pocket and release the shell casing base, in sequence, responsive to reciprocation of the plunger in the loading press.

2. The primer pocket swaging device of claim 1 further comprising an outside bevel located on said collet means and wherein said collet cover means further comprises a hollow collet cover, an internal bevel provided in said collet cover adjacent said outside bevel on said collet means and nipple means adjustably inserted in said collet cover for contacting said collet means and adjusting the space between said outside bevel and said internal bevel and wherein said nipple means is adapted for mounting in the frame of the loading press.

3. The primer pocket swaging device of claim 1 further comprising plunger attachment means carried by said opposite end of said rod means for securing said rod means to the plunger.

4. The primer pocket swaging device of claim 1 further comprising:

(a) an outside bevel located on said collet means and wherein said collet cover means further comprises a hollow collet cover, an internal bevel provided in said collet cover adjacent said outside bevel on said collet means and nipple means adjustably inserted in said collet cover for contacting said collet means and adjusting the space between said outside bevel and said internal bevel and wherein said nipple means is adapted for mounting in the frame of the loading press; and (b) plunger attachment means carried by the opposite end of said rod means for securing said rod means to the plunger.

5. The primer pocket swaging device of claim 2 wherein said collet means further comprises at least two collet segments provided with bore segments for receiving said one end of said rod means and said outside bevel is defined by a segment bevel provided at one end of each of said collet segments, respectively, for engaging said internal bevel in said collet cover and further comprising retaining means connecting said collet segments at the opposite end of said collet segments, whereby said one end of said collet segments are selectively caused to diverge and converge in sequence, responsive to traversal of said one end of said rod means in said bore segments.

6. The primer pocket swaging device of claim 5 wherein said retaining means is an O-ring.

7. The primer pocket swaging device of claim 5 further comprising plunger attachment means carried by the opposite end of said rod means for securing said rod means to the plunger.

8. The primer pocket swaging device of claim 7 further comprising a base groove provided in said opposite end of said collet segments and wherein said retaining means is an O-ring seated in said base groove.

9. The primer pocket swaging device of claim 5 wherein said at least two collet segments is four collet segments.

10. The primer pocket swaging device of claim 9 further comprising plunger attachment means carried by said opposite end of said rod means for securing said rod means to the plunger and a base groove provided in said opposite end of said collet segments, and wherein said retaining means is an O-ring seated in said base groove.

11. The primer pocket swaging device of claim 10 further comprising a collet groove provided in said bore segments at said one end of each of said collet segments, respectively, for engaging the base flange in the shell casing base.

12. The primer pocket swaging device of claim 2 further comprising internal cover threads provided in said hollow collet cover and wherein said nipple means is characterized by an externally threaded nipple and said nipple is inserted in said hollow collet cover in threadible relationship.

13. The primer pocket swaging device of claim 12 further comprising at least one lock nut threaded on said nipple for locking said primer pocket swaging device in the frame of the loading press.

14. The primer pocket swaging device of claim 13 wherein said at least one lock nut is a top lock nut threaded on said nipple and adapted to engage said collet cover for locking said collet cover on said nipple and a bottom lock nut threaded on said nipple below said top lock nut for seating against the frame of the loading press and locking said primer pocket swaging device in the frame of the loading press.

15. The primer pocket swaging device of claim 14 wherein said collet means further comprises at least two collet segments provide with bore segments for receiving said one end of said rod means and said outside bevel is defined by a segment bevel provided at one end of each of said collet segments, respectively, for engaging said internal bevel in said collet cover and further comprising retaining means connecting said collet segments at the opposite end of said collet segments, whereby said one end of said collet segments are selectively caused to diverge and converge in sequence, responsive to traversal of said one end of said rod means in said bore segments.

16. The primer pocket swaging device of claim 15 further comprising:

(a) plunger attachment means carried by said opposite end of said rod means for securing said rod means to the plunger; and (b) a base groove provided in said opposite ends of said collet segments and wherein said retaining means is an O-ring seated in said base groove.

17. The primer pocket swaging device of claim 16 wherein said at least two collet segments is four collet segments.

18. The primer pocket swaging device of claim 1 wherein said rod means further comprises a punch rod having a primary segment with segment threads provided on the base end thereof for attaching said punch rod to the plunger of the loading press; a working segment of reduced diameter extending the primary segment of said punch rod; an enlargement provided in said working segment near the extending end thereof for engaging said collet means; a swaging tip shaped in said extending end of said working segment, said swaging tip projecting from said enlargement for swaging the primer pocket; and a rod neck defining the junction between said working segment and said primary segment, whereby said collet means is expanded when said working segment and said enlargement move downwardly and said rod neck extends below said collet means, and said collet means is contracted when said working segment and said enlargement move upwardly and said rod neck contacts and enters said collet means.

19. The primer pocket swaging device of claim 18 further comprising:

(a) an outside bevel located on said collet means and wherein said collet cover means further comprises a hollow collet cover, an internal bevel provided in said collet cover adjacent said outside bevel on said collet means and nipple means adjustably inserted in said collet cover for contacting said collet means and adjusting the space between said outside bevel and said internal bevel and wherein said nipple means is adapted for mounting in the frame of the loading press; and (b) plunger attachment means carried by said segment threads of said primary segment for securing said punch rod to the plunger.

20. The primer pocket swaging device of claim 19 wherein said collet means further comprises at least two collet segments provided with bore segments for receiving said working segment of said punch rod and wherein said outside bevel is defined by a segment bevel provided at one end of each of said collet segments, respectively, for engaging said internal bevel in said collet cover and further comprising retaining means connecting said collet segments at the opposite end of said collet segments, whereby said one end of said collet segments are selectively caused to diverge and converge in sequence, responsive to traversal of said working segment, said enlargement and said rod neck in said bore segments.

21. The primer pocket swaging device of claim 20 further comprising a base groove provided in said opposite ends of said collet segments and wherein said retaining means is an O-ring seated in said base groove and a collet groove provided in said bore segments at said one end of each of said collet segments, respectively, for engaging the base flange in the shell casing base.

22. The primer pocket swaging device of claim 21 wherein said at least two collet segments is four collet segments.

23. The primer pocket swaging device of claim 22 further comprising internal cover threads provided in said hollow collet cover and wherein said nipple means is characterized by an externally threaded nipple and said nipple is inserted in said hollow collet cover in threadible relationship.

24. The primer pocket swaging device of claim 23 further comprising at least one lock nut threaded on said nipple for locking said primer pocket swaging device in the frame of the loading press.

25. The primer pocket swaging device of claim 24 wherein said at least one lock nut is a top lock nut threaded on said nipple and adapted to engage said collet cover for locking said collet cover on said nipple and a bottom lock nut threaded on said nipple below said top lock nut for seating against the frame of the loading press and locking said primer pocket swaging device in the frame of the loading press.

26. A primer pocket swaging device for use in a cartridge loading apparatus having a frame shaped to receive the primer pocket swaging device and a plunger adapted to reciprocate in the frame, said primer pocket swaging device comprising a generally cylindrically-shaped, hollow, internally-threaded collet cover; an internal bevel provided in one end of said collet cover and an opening located in said one end of said collet cover adjacent said internal bevel, for receiving a shell casing base having a base flange and an empty primer pocket; expandable collet means located inside said collet cover for engaging the base flange and selectively securing the shell casing base inside the collet cover; and a punch rod having one end projecting through said collet means in slidable relationship, with the opposite end of said punch rod carried by the plunger, for selectively expanding and contracting said collet means and receiving and gripping the shell casing base and swaging the primer pocket, and then releasing the shell casing base, in sequence, responsive to manipulation of the plunger in the cartridge loading apparatus.

27. The primer pocket swaging device of claim 26 further comprising a nipple threadibly engaging said collet cover for retaining said collet means inside said collet cover.

28. The primer pocket swaging device of claim 27 further comprising plunger attachment means carried by said opposite end of said punch rod for removably securing said punch rod to the plunger.

29. The primer pocket swaging device of claim 28 wherein said collet means further comprises at least two collet segments provided with bore segments for receiving said one end of said punch rod and segment bevels provided at one end of said collet segments, respectively, for engaging said internal bevel in said collet cover and retaining means connecting said collet segments at the opposite end thereof, whereby said one end of each of said collet segments is selectively caused to diverge and converge in sequence with respect to each other responsive to traversal of said punch rod in said bore segments.

30. The primer pocket swaging device of claim 29 wherein said punch rod further comprises a primary segment; a working segment extending from said primary segment, said working segment having a smaller diameter than said primary segment; an enlargement provided in said working segment near one end thereof for engaging said bore segments of said collet segments; a swaging tip projecting from said enlargement for swaging the primer pocket; and a rod neck defining the intersection of said working segment and said primary segment, whereby said collet segments are expanded when said working segment and said enlargement move downwardly in said bore segments and said rod neck extends below said collet segments and said collet segments are contracted when said working segment and said enlargement move upwardly and said rod neck contacts and enters said bore segments.

31. The primer pocket swaging device of claim 30 wherein said at least two collet segments is four collet segments.

32. The primer pocket swaging device of claim 31 further comprising a base groove provided in said opposite ends of said collet segments and wherein said retaining means is an O-ring seated in said base groove.

33. The primer pocket swaging device of claim 32 further comprising at least one lock nut threaded on said nipple for locking said primer pocket swaging device in the frame of the loading press.

34. The primer pocket swaging device of claim 33 wherein said at least one lock nut is a top lock nut threaded on said nipple and adapted to engage said collet cover for locking said collet cover on said nipple and a bottom lock nut threaded on said nipple below said top lock nut for seating against the frame of the loading press and locking said primer pocket swaging device in the frame of the loading press.

35. The primer pocket swaging device of claim 34 further comprising a collet groove provided in said bore segments at said one end of each of said collet segments, respectively, for engaging the base flange in the shell casing base.

36. A primer pocket swaging device for use in a cartridge loading apparatus having a frame shaped to receive the primer pocket swaging device, a plunger adapted to reciprocate in the frame and an arm pivotally carried by the frame for reciprocating the plunger, said primer pocket swaging device comprising a hollow, internally-threaded collet cover; an internal bevel provided in one end of said collet cover and an opening located in said one end of said collet cover adjacent said internal bevel for receiving a shell casing base having a base flange and an empty primer pocket; a plurality of expandable collet segments located inside said collet cover, said collet segments each having a bore segment, a base and an engaging end for engaging and selectively securing the shell casing base inside the collet cover; resilient retaining means provided at said base of said collet segments for connecting said collet segments; nipple means engaging said collet cover for mounting said collet cover to the frame of the cartridge loading apparatus; and a punch rod having one end slidably projecting through said collet segments, said punch rod adapted to reciprocate inside said collet segments, with the opposite end of said punch rod removably carried by the plunger, for selectively expanding the engaging end of said collet segments, receiving the shell casing base, contracting said engaging end of said collet segments, gripping the shell casing base, swaging the primer pocket and expanding the engaging end of the collet segments and releasing the shell casing base, in sequence, responsive to manipulation of the arm and operation of the plunger in the cartridge loading apparatus.

37. The primer pocket swaging device of claim 36 further comprising plunger attachment means carried by said opposite end of said punch rod for removably securing said punch rod to the plunger.

38. The primer pocket swaging device of claim 36 wherein said resilient retaining means connecting said base of said collet segments is a resilient ring.

39. The primer pocket swaging device of claim 36 wherein said a nipple means is an externally threaded nipple threadibly engaging said collet cover for retaining said collet segments inside said collet cover.

40. The primer pocket swaging device of claim 36 further comprising plunger attachment means carried by said opposite end of said punch rod for removably securing said punch rod to the plunger and wherein:

(a) said resilient retaining means connecting said base of said collet segments is a resilient ring; and (b) said nipple means is an externally threaded nipple threadibly engaging said collet cover for retaining said collet segments inside said collet cover.

41. The primer pocket swaging device of claim 40 wherein said punch rod further comprises a primary segment; a working segment extending from said primary segment, said working segment having a smaller diameter than said primary segment; an enlargement provided in said working segment near one end thereof for engaging said bore segments of said collet segments; a swaging tip projecting from said enlargement for swaging the primer pocket; and a rod neck defining the intersection of said working segment and said primary segment, whereby said collet segments are expanded when said working segment and said enlargement move downwardly in said bore segments and said rod neck extends below said collet segments and said collet segments are contracted when said working segment and said enlargement move upwardly and said rod neck contacts and enters said bore segments.

42. The primer pocket swaging device of claim 41 wherein said plurality of collet segments is four collet segments.

43. The primer pocket swaging device of claim 42 further comprising a base groove provided in said base of said collet segments and wherein said resilient ring is an O-ring seated in said base groove.

44. The primer pocket swaging device of claim 43 further comprising at least one lock nut threaded on said nipple for locking said primer pocket swaging device in the frame of the loading press.

45. The primer pocket swaging device of claim 44 wherein said at least one lock nut is a top lock nut threaded on said nipple and adapted to engage said collet cover for locking said collet cover on said nipple and a bottom lock nut threaded on said nipple below said top lock nut for seating against the frame of the loading press and locking said primer pocket swaging device in the frame of the loading press.

46. The primer pocket swaging device of claim 45 further comprising a collet groove provided in said bore segments at said one end of each of said collet segments, respectively, for engaging the base flange in the shell casing base.

* * * * *